3,798,285
Patented Mar. 19, 1974

3,798,285
OLEFIN OLIGOMERIZATION PROCESS
Jin Sun Yoo, South Holland, Ill., assignor to Atlantic Richfield Company, Los Angeles, Calif.
No Drawing. Continuation-in-part of abandoned application Ser. No. 824,268, May 13, 1969. This application Nov. 26, 1971, Ser. No. 202,653
Int. Cl. C07c 3/20
U.S. Cl. 260—683.15 D          12 Claims

ABSTRACT OF THE DISCLOSURE

A catalyst composition for the oligomerization, including dimerization, of olefins is provided by combining (A) manganese, (B) a monophosphine electron donor ligand, and (C) a Lewis acid-reducing agent, in molar ratios of (B) to (A) of about 1 to 10:1 and (C) to (A) of about 5 to 25:1. Preferred catalyst components are manganic acetylacetonate, triphenylphosphine and ethylaluminum sesquichloride.

---

This application is a continuation-in-part of application Ser. No. 824,268, filed May 13, 1969, now abandoned.

This invention relates to a catalyst composition and its use in the oligomerization, including dimerization, of olefins. In particular aspects, the invention relates to a process for the formation of hexenes by dimerization of propylene and to a catalyst therefor. Such catalyst composition smay be unsupported, or they may be supported on a suitable base.

Numerous catalysts have been disclosed in the prior art as suitable for the preparation of polymeric products of olefins, particularly to form low molecular weight dimers, trimers, tetramers, etc. of such olefins. Normally gaseous olefins such as propylene have, for example, been effectively dimerized using these catalyst systems to produce hexane fractions of varying compositions. The polymeric and oligomeric products produced in such reactions are often valuable in either the petrochemical field or the fuel industry or both. One of the major fractions of dimeric propylenes, 2-methylpentenes, can be utilized, for instance, for the synthesis of isoprene. Another propylene dimerization product, 2,3-dimethylbutene, is useful as a feed for the production of 2,3-dimethylbutadiene which in turn can be used in a multi-step synthesis of pyromellitic anhydride, or can be hydrogenated to yield 2,3-dimethylbutane, useful as an octane-enhancing ingredient in gasoline. The latter compound, for example, has the highest research octane number (103.5) of those paraffins having boiling points up to 140° F.

It has now been found that certain hydrocarbon oxygen-containing complexes of manganese with an organomonophosphine electron donor ligand, when combined with a non-protonic Lewis acid capable of forming a coordination bond with manganese, and a reducing agent capable of reducing manganic acetylacetonate to an oxidation state of less than 3, and even to 0, provide a catalyst composition having highly desirable physical and chemical characteristics and, particularly, excellent catalytic activity and selectivity for the oligomerization, including dimerization, of low molecular weight olefins. To obtain such compositions, the catalyst-forming reactants can be combined in a molar ratio of electron donor ligand to manganese compound of about 1 to 10:1, preferably about 2 to 7:1; and a Lewis acid-reducing agent to manganese compound molar ratio of about 5 to 25:1, preferably about 8 to 15:1.

In the preparation of the catalyst composition of the present invention, the manganese source is provided by hydrocarbon oxygen-containing compounds of the metal which are at least slightly soluble in some solvent wherein the manganese-phosphine ligand complex can be formed. Prefered are the weak field ligand complexes, the ligands of which readily serve in solution as transfer agents. Suitable sources of the manganese compound include alkoxy compounds, alkoxy carboxylate compounds, saturated and unsaturated hydrocarbon carboxylate compounds, aromatic carboxylate compounds, saturated and unsaturated dicarboxylate compounds. Typical examples of such compounds are dialkoxy manganese, ie.. $Mn(OR)_2$, where R represents alkyl, aryl, aralkyl, and the like groups; dialkoxy manganese carboxylate, i.e. $(RO)_2MnOOCR'$, where R and R' are as defined above as R; salts of saturated monocarboxylic acids, e.g. manganese formate, manganese propionate, manganese caproate, manganese octoate, manganese palmitate, manganese stearate, and the like; salts of corresponding unsaturated monocarboxylic acids, e.g. manganese acrylate, manganese vinylacetate, and the like; salts of saturated dicarboxylic acids, e.g. manganese adipate, manganese decane-1,10-dicarboxylate, and the like; salts of corresponding unsaturated dicarboxylic acids, e.g. manganese muconate and the like; salts of cyclic and aromatic carboxylic acids, e.g. manganese cyclohexane carboxylate, manganese phenylacetate, manganese benzoate, manganese phthalates, and the like; and dialkoxy carboxylates, e.g., manganese dimethoxyacetate and the like. Also available as manganese sources are chelates formed by the manganese and weak field ligands, such as β-diketones or β-keto-carboxylic acid esters and salts of carboxylic acids. Examples of these types of manganese sources include β-diketo manganese (III), acetylacetonato manganese (III), propylacetonato manganese (III), benzoylacetonato manganese; and chelates from β-ketocarboxylic acid esters. The hydrocarbon oxygen-containing manganese compounds such as set forth above, in general contain a number of carbon atoms within the range of from 1 to about 18, more preferably from 1 to about 12, and still more preferably from 1 to about 8. Preferred as a source of manganese is manganic acetylacetonate.

The electron donor ligand component employed in preparing the manganese complex component of the catalyst of the present invention is preferably a triorganophosphine corresponding to the general formula $R_3P$ wherein R is a hydrocarbon radical, e.g. alkyl, aryl, alkaryl, aralkyl and cycloalkyl of from 1 to about 20 carbon atoms, preferably 2 to about 6 carbon atoms, and preferably devoid of olefinic or acetylenic unsaturation; different R groups may, of course, be present in the same phosphine molecule. When the phosphine component contains aromatic groups it is generally preferred that these have monocyclic structures, e.g. that the groups be selected from phenyl, alkylphenyl, or phenylalkyl radicals.

The presence of the electron donor ligand component, preferably a triorganophosphine, which apparently can enter into a complex-forming reaction with the manganese compound, makes for a more active catalyst composition. The phosphine component is monodentate or unidentate, i.e. unifunctional, as regards the phosphorus atom. Use of multifunctional phosphines such as bis(diphenylphosphino)ethane in place of the unidentate phosphine in the catalyst composition of the present invention has been found, for example, to result in a composition showing no catalytic actiivty for the dimerization of propylene. Examples of suitable phosphines for the composition of the present invention are triphenylphosphine, trimethylphosphine, tricyclohexylphosphine, tri-n-butylphosphine, tri-n-decylphosphine, tribenzylphosphine, tri-(4-n-butylphenyl)-phosphine, and the like.

The Lewis acid and the reducing agent functions of the catalyst are preferably supplied in a single compound. As examples of such compounds, there may be mentioned the acidic metal halides which correspond to the general formula

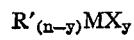
$R'_{(n-y)}MX_y$ wherein M is a metallic element of coordination number $n$ whose halides are Lewis acids, X is a halogen having an atomic number of 9 to 53, i.e. fluorine, chlorine, bromine, iodine, R' is hydrocarbyl of 1 to about 10 carbon atoms, e.g. alkyl, of 2 to about 6 carbon atoms and $y$ is a number having a value from greater than 0 to $n$. Preferred metallic elements in the above compound include aluminum, magnesium, beryllium, lead, zinc and tin. Examples of suitable acidic metal halides include alkylaluminum halides including mono-, sesqui-, and dihalides, aluminum trichloride, zinc chloride and stannic chloride. Specific examples of suitable alkylaluminum halides are diethylaluminum chloride, fluoride, iodide, and bromide; ethylaluminum dichloride; ethylaluminum sesquichloride, etc.

Where the particular reducing agent employed in the composition does not also perform as a Lewis acid, it is necessary to separately supply the Lewis acid to the catalyst composition. Examples of reducing agents which are suitable in the preparation of the catalyst composition but which do not perform as Lewis acids therein include trialkylaluminum, monoalkoxydialkylaluminum and dialkylaluminum hydrides wherein the alkyl and alkoxy groups contain up to about 6 carbon atoms. Other examples are Grignard reagents, allyl and alkyl tin complexes, and the like. The reducing agent must be compatible with the Lewis acid and be capable of reducing manganic acetylacetonate, preferably to an oxidation state lower than 3 and even to 0.

Where the reducing agent does not also function as a Lewis acid, an additional Lewis acid component can be supplied by a compound which is other than a protonic or hydrogen acid and which is capable of receiving one or more pairs of electrons to form a coordination bond. Lewis acids are well known to the art and are fully defined for example by Noller Chemistry of Organic Compounds, W.B. Saunders, 1951, at pages 233–235, by Stone Chemical Review (1958) at page 101, and by G.N. Lewis Journal of the Franklin Institute (1938), pages 226–293. Examples of Lewis acids which are not included as a component of a compound which also serves as a reducing agent include boron-trifluoride, boron-trifluoride etherates, e.g. diethyletherate, aluminum trihalides, zinc halides and stannic halides.

The relative proportions of the components of the catalyst composition, i.e., the manganese compound, the Lewis acid and reducing agent, and the electron donor ligand, determine the catalytic character of the composition. The catalyst composition is ordinarily formed by using an electron donor ligand-to-manganese mole ratio of about 2 to 6:1, preferably about 2 to 4:1. The amount of the Lewis acid-reducing agent, e.g. ethyl aluminum sesquichloride, can preferably vary in more or less direct proportion with the ratio of electron donor ligand-to-manganese, generally increasing as the ligand is increased.

The preparation of the overall catalyst composition is preferably conducted by first forming the complex of the electron donor ligand and the manganese source and then adding to a solution or suspension, of that complex, in a suitable organic solvent, the reducing agent and the Lewis acid. Suitable organic solvents for the final catalyst composition are those which are inert to the catalyst and which will not significantly enter into, or deleteriously effect, the eventual polymerization reaction. As specific examples thereof may be mentioned aromatic and aliphatic hydrocarbons and their halogenated, e.g. chlorinated, derivatives. Oxygen-containing solvents are generally to be avoided for this purpose. The catalyst can also be deposited on a support, such as activated carbon, etc.

Formation of the ligand-manganese complex may be effected by simply mixing the two reactants in the presence of a suitable solvent for the complexing reaction. The mixing may be done at room temperature or at temperatures as high as about 300° F. The complex usually forms within about 20 to 40 minutes after mixing at elevated temperature. Suitable solvents for the complex-forming reaction include the same solvents which are suitable for use in the final catalyst composition. If desired, however, the complexing may be accomplished in a solvent which is unsuitable for use in the final composition; in this case, the resultant complex will first be isolated from the reaction mixture and redissolved, or resuspended, in a proper solvent which is inert to the final catalyst composition.

Thus, for example, one method of preparing a phosphine-manganese complex can involve stirring, preferably at room temperature, a mixture of triphenylphosphine, manganic acetylacetonate and toluene. After the resulting complex has been formed there may then be added directly to the reactant mixture the reducing agent and Lewis acid.

In another method the complex may be prepared by refluxing an alcohol, e.g. ethanol, solution of the phosphine, say triphenylphosphine, and manganic acetylacetonate, preferably at a temperature of about 150 to 250° F., and isolating the resultant complex from the reactant mixture. This approach is often preferred where the manganese reagent contains some water of hydration, as the water will be removed from the complex when the latter is separated from the alcohol solvent. The isolated complex can then be dissolved or suspended in a suitable inert solvent, e.g. toluene, and the reducing agent and Lewis acid added thereto to form the catalyst composition of the present invention.

The addition to the complex solution of the reducing agent and Lewis acid is preferably conducted in a dry, inert atmosphere, out of the presence of air, for instance in an autoclave. Within a relatively short period of time after the admixing of the components, e.g. about 5 to 15 minutes, an active catalyst composition is formed which may be used to catalyze the oligomerization of low molecular weight olefins.

The catalyst compositions of this invention may be used to catalyze the production of liquid oligomers including dimers, trimers and tetramers, of mono-ethylenically unsaturated olefinic hydrocarbons of 2 to about 6, or even up to about 8, carbon atoms, as well as monophenyl- or diphenyl-derivatives thereof. By the terms "oligomerization" and "oligomer" it is meant to include herein oligomerization and cooligomers as well as homooligomerization and homooligomers, examples of which are dimerization and dimers, trimerization and trimers, etc., as well as cross- or co-dimerization, etc. For example, by cross-dimerization, used here as being synonymous with co-dimerization, is meant the addition reaction combining one mole of a first olefin, for instance propylene, with one mole of a second olefin, for instance, butene, to form one mole of a cross-dimer, for instance heptene. By dimerization, on the other hand, is meant the addition reaction which simply combines two moles of a single olefin, for instance propylene, to form the respective dimer, for instance hexene. Oligomerization and oligomers are the terms here used to embrace all of these reactions and reaction products.

Thus, suitable feeds include, for instance, monoethylenically unsaturated olefins, such as internal- and alphaolefins, such as ethylene, propylene and butenes; and phenyl-substituted derivatives of the foregoing olefins, such as styrene and 1-phenylbutene-2. The oligomers produced by the action of this present catalyst composition will often be of 2 to about 4 monomer units per molecule, i.e. will often range from dimers to tetramers including mixtures thereof. The catalyst composition has been found, for example, to be especially suitable for the production of hexene fractions by the dimerization of propylene.

Oligomerization can be effected by contacting the olefinically-unsaturated feed at an elevated temperature of, for instance, about 100 to 300° F., preferably, about 150 to 180° F., which ordinarily can be maintained by the heat of reaction without external heating means. In many cases, it is necessary to control the temperature by cooling, as for example, by circulating a cooling medium through heat exchange tubes in the reactor. A pressure of about 0 to 1500 or more p.s.i.g., preferably about 250 to 1000 p.s.i.g., is suitable with the catalyst composition of the present invention. Generally, higher pressures and temperatures are favorable for the reaction. The amount of catalyst composition used in the reaction is that sufficient to effect oligomerization of the feed, and often is about 0.05 to 5 weight percent, preferably about 0.1 to 1%, of catalyst composition (not including the solvent therefor) based on the weight of olefinic hydrocarbon feed. It has also been found that when the catalyst is prepared on a high surface area support, such as, for example activated carbon, still other advantages, such as ease of handling, accrue. Thus, the oligomeriztion process of this invention provides for at least a 50 mole percent conversion of the olefin feed to an oligomer having 2 to 4 repeating units includig mixtures thereof. As will be more fully illustrated in the following examples, yields of such oligomerized olefins can be obtained in conversions of 60 mole percent and higher.

The preparation and utilization of the catalyst of the present invention are illustrated by the following examples. Details of reaction conditions, catalyst compositions, and product distribution for these examples are listed in Tables I and II.

EXAMPLE I

A 300 cc. stainless steel autoclave equipped with a magnetic stirrer was used as a reactor. Manganic acetylacetonate, $Mn(acac)_3$, in an amount of 1.78 mmoles (millimoles) and triphenylphosphine, $\phi_3 P$, in an amount of 5.32 mmoles, were weighed into the reactor with 35 ml. of toluene. While the reactor was purged with nitrogen, these components were allowed to react with vigorous agitation at 100–120° F. for about 20 minutes. A toluene solution of ethylaluminum sesquichloride, $Et_3Al_2Cl_3$, (25.82 mmoles) was injected into the system, and the system tightly closed. The total amount of toluene introduced into the reactor was 50 ml. propylene in the amount of 195 ml. was fed into the reactor at 210–280 p.s.i.g. over a 15 minute period. The temperature of the system was 140–150° F. After the feeding was completed, the system was allowed to react for about 175 minutes. A moderate pressure drop (from 300 to 120 p.s.i.g.) was observed during this period, and the temperature held at 140–160° F. Reaction was discontinued by discharging the light yellow precipitates into a cold flask. After the catalyst in the reaction mixture was destroyed with dilute HCl, an organic layer was separated from the lower aqueous portion. About 70 g. of product was obtained and it was found to be composed of 56.61 percent 2-methylpentenes, 23.30 percent n-hexenes and 9.38 percent 2,3-dimethylbutenes with a very small amount of heavy product (approximately 2 percent). The structures of the products were identified by means of gas chromatographic techniques.

EXAMPLE II

Both 1.71 mmoles of $Mn(acac)_3$ and 11.39 mmoles tri-n-butyl phosphine, ($Bu_3P$), were weighed into a reactor as in Example I. A toluene solution of $Et_3Al_2Cl_3$ (18.79 mmoles) was injected into the system. The total amount of toluene introduced was 45 ml. Propylene (185 ml.) was introduced into the catalyst system at 160–300 p.s.i.g. and 135–145° F. over a half hour period and the system was allowed ot react overnight (about 17 hours) at 145° F. The pressure of the system was found to be 80 p.s.i.g. at the end of this time. About 65 g. of product was obtained, and the conversion of propylene was 67 percent. Despite the prolonged reaction period, a very limited amount (1.6 percent) of heavy product (mostly nonenes) was found in the product along with roughly 20 percent 2,3-dimethylbutenes, 56 percent 2-methylpentenes and 12 percent n-hexenes.

It is interesting to note that the use of tri-n-butyl-phosphine as the electron donor ligand produced an increased amount of 2,3-dimethylbutenes (about 20 percent) whereas the use of triphenylphosphine produced less than 10 percent of 2,3-dimethylbutenes in the product.

EXAMPLE III

In another run, 1.58 mmoles of $Mn(acac)_3$, 3.71 mmoles of $\phi_3 P$, and 18.76 mmoles of $Et_3Al_2Cl_3$ were charged into the reactor with a total of 40 ml. of toluene in the same manner as in the previous examples. Propylene (165 ml.) was fed into the catalyst system at 330–200 p.s.i.g. and at 150° F. over a 40 minute period. The reaction was allowed to proceed for 140 minutes at 150° F. and the pressure dropped to 130 p.s.i.g. during this time. The discharged yellow reaction mixture with bright yellow precipitates was treated with dilute HCl and an organic portion was isolated for analysis. About 50 g. of product was obtained, representing a 57 percent yield. Reaction and product data are listed in Tables I and II.

EXAMPLE IV

A binary catalyst system was prepared from 1.77 mmoles of $Mn(acac)_3$ and 29.3 mmoles $Et_3Al_2Cl_3$ in 55 ml. of toluene. Propylene (180 ml.) was fed to the system, which was held at 270–340 p.s.i.g. and 128–160° F. for 4 hours. No significant pressure drop was observed during this period and it appeared that this system was inactive for the reaction, thus indicating the essential role of electron donor ligands in these catalyst systems.

TABLE I

| Example | Catalyst component, mmoles | | | Toluene, ml. | Reaction conditions | | |
|---|---|---|---|---|---|---|---|
| | $Mn(acac)_3$ | $R_3P$ | $Et_3Al_2Cl_3$ | | Pressure, p.s.i.g. | Temp., °F. | Reaction period, hrs. |
| I | 1.87 | $\phi_3 P$, 5.32 | 25.82 | 50 | 120–300 | 140–160 | 3⅙ |
| II | 1.71 | $Bu_3P$, 11.39 | 18.79 | 45 | 80–300 | 135–145 | 18 |
| III | 1.58 | $\phi_3 P$, 3.71 | 18.76 | 40 | 130–330 | 120–150 | 3 |
| IV | 1.77 | 0.00 | 29.35 | 55 | 270–340 | 128–160 | 4 |

TABLE II

| Example | Production distribution, weight percent | | | | | Wt. of total (g.) | Conversion (percent) |
|---|---|---|---|---|---|---|---|
| | 2,3DMC$_4$[1] | 2MC$_5$[2] | nC$_6$[3] | Unknown[4] | $C_8C_9$ | | |
| I | 9.38 | 56.61 | 23.30 | 7.79 | 2.04 | 69.5 | 68.4 |
| II | 19.35 | 56.30 | 12.43 | 9.46 | 1.55 | 64.5 | 66.8 |
| III | 8.09 | 49.15 | 26.22 | 12.62 | 3.92 | 49.5 | 57.1 |

[1] 2,3-dimethylbutenes.
[2] 2-methylpentenes.
[3] Normal hexenes.
[4] Boiling points are in the range of hexenes.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. In a process for oligomerizing monoolefinic hydrocarbons of 2 to about 8 carbon atoms to a oligomer product containing from 2 to 4 repeating monomer units and mixtures thereof, the improvement which comprises conducting said oligomerization in contact with a catalyst comprising the reaction product of a complex of
  (A) a hydrocarbon oxygen-containing manganese compound, and
  (B) an electron donor ligand phosphine of the formula $R_3P$, in which R is hydrocarbon of up to about 20 carbon atoms, with
  (C) a hydrocarbyl metal halide reducing agent capable of reducing manganic acetyl acetonate to an oxidation state of less than 3 and a non-protonic Lewis acid capable of forming a coordination bond with manganese having the following structural formula $$R'_{(n-y)}MX_Y$$

wherein M is a metallic element of coordination number $n$ whose halides are Lewis acids, X is a halogen having an atomic number of 9 to 53, R' is hydrocarbyl, and Y is a number having a value greater than 0; said reactants B and A being combined in a molar ratio of B to A of about 1 to 10:1 and reactants C and A being combined to reduce manganese to an oxidation state of less than 3 and in a molar ratio of C to A of about 5 to 25:1, said process being conducted at a temperature of from about 100° F. to about 300° F. and recovering a oligomerized product at a conversion of at least a 50 mole percent of the olefin feed to the oligomer product.

2. A process of claim 1 wherein M is aluminum, R' is alkyl having 2 to about 6 carbon atoms and X is chlorine or bromine.

3. A process of claim 2 wherein the reducing agent is an alkyl aluminum chloride.

4. A process of claim 1 wherein the mole ratios of B to A is about 2 to 7:1 and of C to A is about 8 to 15:1.

5. A process of claim 3 wherein the mole ratios of B to A is about 2 to 7:1 and of C to A is about 8 to 15:1.

6. A process of claim 1 wherein each R is selected from the group consisting of alkyl, aryl, alkaryl, aralkyl and cycloalkyl.

7. A process of claim 3 wherein each R is selected from the group consisting of alkyl, aryl, alkaryl, aralkyl and cycloalkyl.

8. A process of claim 7 wherein each R has from 2 to about 6 carbon atoms.

9. A process of claim 8 wherein each R is phenyl and (A) is manganic aceylacetonate.

10. A process of claim 1 wherein the monoolefinic hydrocarbon is propylene.

11. A process of claim 3 wherein the monoolefinic hydrocarbon is propylene.

12. A process of claim 7 wherein the monoolefinic hydrocarbon is propylene.

References Cited
UNITED STATES PATENTS

| | | | |
|---|---|---|---|
| 3,558,515 | 1/1971 | Kittleman et al. | 252—429 |
| 3,663,451 | 5/1972 | Hill | 252—431 |
| 3,457,319 | 7/1969 | Olechowski et al. | 260—677 |
| 3,450,732 | 6/1969 | Wilke et al. | 260—429 |
| 3,644,445 | 2/1972 | Kroll | 260—429 |

PAUL M. COUGHLAN, Jr., Primary Examiner

U.S. Cl. X.R.

252—431 P